A. E. WENZEL.
Lathe Dog.
No. 30,997. Patented Dec. 18, 1860.
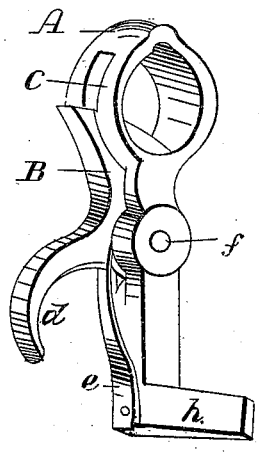
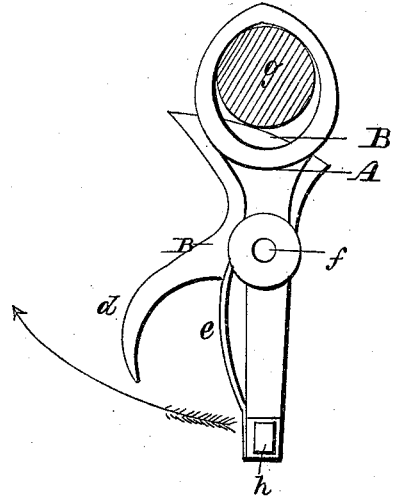
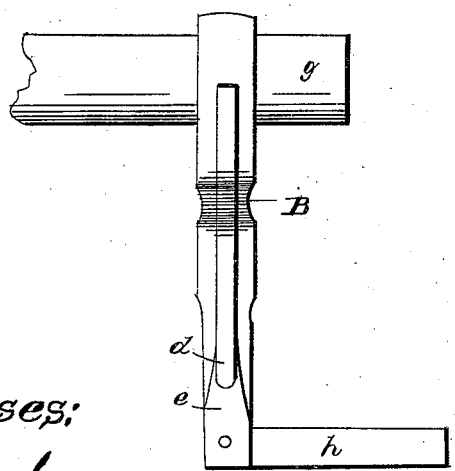
Witnesses:
Inventor:
Adolphus E Wenzel

UNITED STATES PATENT OFFICE.

ADOLPHUS E. WENZEL, OF NEW YORK, N. Y.

AUTOMATIC LATHE-DOG.

Specification of Letters Patent No. 30,997, dated December 18, 1860.

*To all whom it may concern:*

Be it known that I, ADOLPHUS E. WENZEL, of the city, county, and State of New York, have invented a new and useful tool, called a "lathe-dog" or "driver," the nature of which consists in combining a cam or "eccentric" with an ordinary lathe-dog in such a manner that they will adjust themselves to the diameter of the shaft to be turned and clutch said shaft and drive it around in the lathe when it is being turned; and I do hereby declare that the following is a full, clear, and exact description of the construction and operation of the same, reference being had to the annexed drawings, making a part of this specification, in which—

Figure 1 is a perspective view; Fig. 2, a side view, and Fig. 3 a front view.

Like letters refer to the same parts.

(A) is a "lathe dog" or "driver", made in the usual way, except that there is a slot to receive the cam (B) which turns on the pin (*f*). There is also a spring (*e*) riveted to the dog, to force the cam against the shaft. Figs. 2 and 3 represent the dog attached to the shaft (*g*). It will be perceived that by turning the dog around in the direction of the arrow, the cam will clutch the shaft and carry it along, and by pressing the handle (*d*) of the cam toward the dog the shaft will be released.

(*h*) is the spur of the dog that fits into the face plate of the lathe.

I construct the dog of cast iron, and the cam and its pin of steel. They may however be made of any suitable metal.

What I claim as my invention and desire to secure by Letters Patent is—

The combination of the lathe dog (A) and cam (B) substantially as described and for the purpose set forth.

ADOLPHUS E. WENZEL.

Witnesses:
J. S. MORGAN,
M. A. GAYLES.